United States Patent [19]
Levenberg

[11] 3,726,551
[45] Apr. 10, 1973

[54] TUBULAR RIGID ANGLED JOINT
[76] Inventor: Nat Levenberg, 2 Windsor Place, Lynbrook, N.Y. 11563
[22] Filed: June 30, 1971
[21] Appl. No.: 158,300

[52] U.S. Cl..................287/54 A, 52/475, 52/656
[51] Int. Cl................................................F16b 7/00
[58] Field of Search..............287/54 A, 54 B, 54 C, 287/189.36 R, 189.36 C, 189.36 D, 189.36 F, 189.36 H; 52/656, 475, 726; 40/152, 155; 297/440

[56] References Cited

UNITED STATES PATENTS

| | | | |
|---|---|---|---|
| 3,480,313 | 11/1969 | Halko | 287/54 A X |
| 3,272,582 | 9/1966 | Anderson et al. | 287/54 A X |
| 3,462,893 | 8/1969 | Kaiser | 287/54 B X |
| 3,357,149 | 12/1967 | Johnston | 287/189.36 H X |
| 3,434,748 | 3/1969 | Leurent | 287/54 C |
| 3,472,539 | 10/1969 | Fenwick | 287/189.36 R X |
| 3,561,801 | 2/1971 | Chiu | 287/54 C |
| 3,643,989 | 2/1972 | Sattler | 287/54 C X |

FOREIGN PATENTS OR APPLICATIONS 6,703,440 9/1967 Netherlands.................287/189.36 F Primary Examiner—David J. Williamowski
Assistant Examiner—Wayne L. Shedd
Attorney—Charles E. Temko

[57] ABSTRACT

A tubular furniture construction characterized in providing modular units which can be assembled without the use of screws, bolts, detents or external mechanical deformation, as well as welding or brazing. Outer tubular members are generally rectangular in cross section and define a rectilinear cavity therein. Inner tubular members are correspondingly rectangular, including three or four walls, with one wall recessed with respect to two adjacent walls to provide an interstice, there being a resilient locking tab mounted on the recessed wall, which is provided with barbs capable of engaging an inner surface of an overlying wall of said outer tubular member to prevent relative movement in a direction which would disengage the inner and outer members. One form of outer tubular member includes a laterally extending flange which is offset with respect to the principal axis thereof, so as to selectively support shelves at one edge thereof of varying thickness. Additional rigidity of an assembled structure is enhanced by providing one or more corner units in which the inner tubular members are disposed at slightly less than a mutual right angle, said members flexing to exert a stress upon engaged outer tubular members in a direction perpendicular to the principal axis of said tubular members, this structure permitting unusually large commercial tolerance in sizes.

4 Claims, 6 Drawing Figures

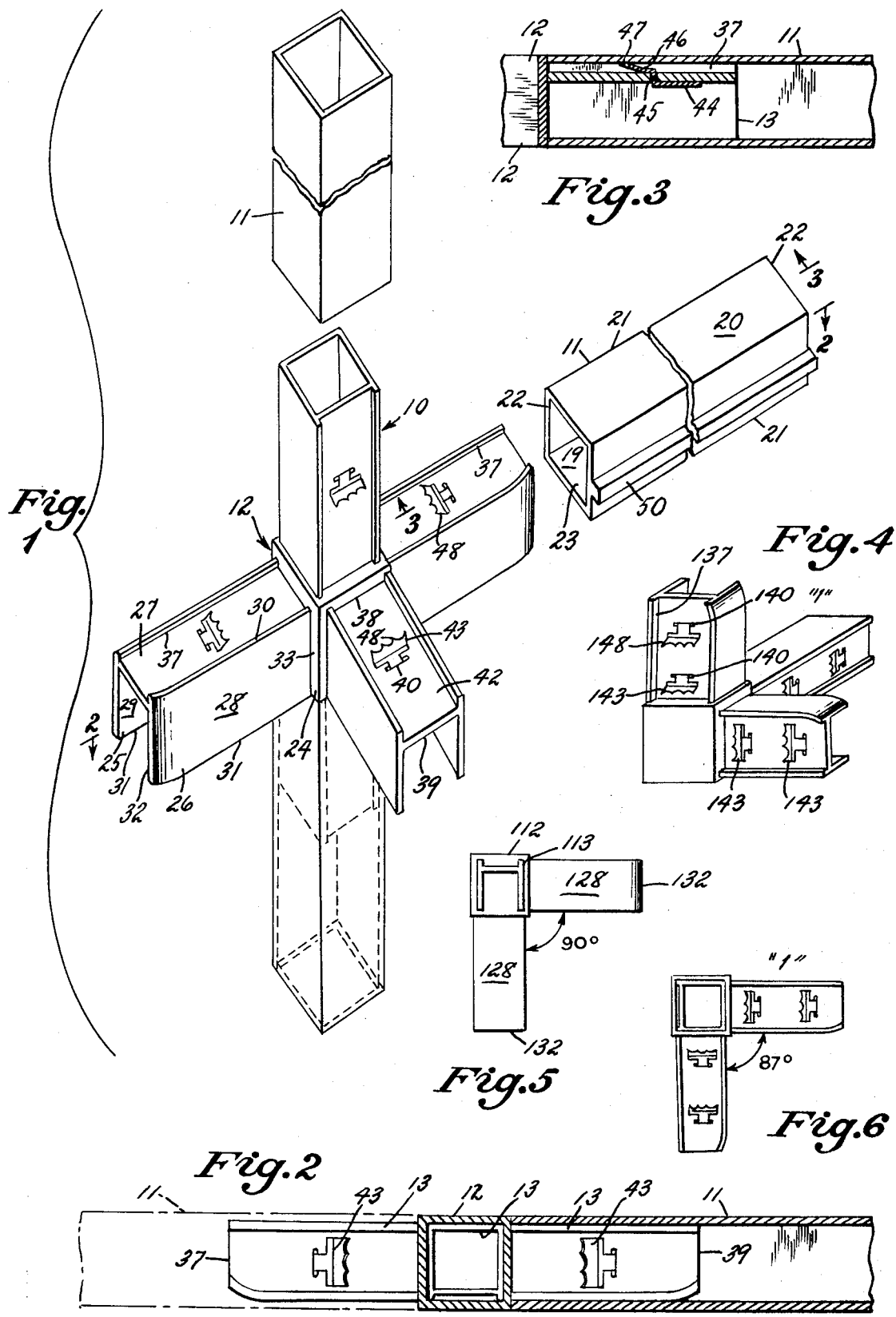

TUBULAR RIGID ANGLED JOINT

This invention relates generally to the field of metallic tubular furniture construction, in which a plurality of outer tubular members are interconnected by means engaging one or more of such tubular members to form an assembled structure. This type of construction is most often used where furniture is sold in knock-down condition, to be assembled by the purchaser, and costs of transportation are thereby substantially reduced.

While many constructions of the instant type have been previously known in the prior art, many of these have offered substantial disadvantages in that assembly requires the use of nuts and bolts which are exposed to view when the furniture is assembled, thereby resulting in an appearance which is often unacceptable. Other structures have provided resilient detents which are also exposed to view once the furniture is assembled. Welding or brazing is usually not available as an assembly step, owing to the lack of equipment and skill on the part of the purchaser, and as a result, almost all furniture of this type has left something to be desired from the standpoint of an attractive appearance.

It is therefore among the principal objects of the present invention to provide an improved construction in which high mechanical joint strength is achieved without the necessity of nuts, bolts or rivets, or welding or brazing techniques.

Another object of the invention lies in the provision of an improved tubular furniture construction, in which commercial tolerances with respect to sizing may be unusually high without deleterious effect.

Yet another object of the invention lies in the provision of an improved tubular furniture construction of the class described which may be conveniently assembled by those possessing only ordinary skill, and using ordinary tools, and without the exercise of great strength.

Yet another object of the invention lies in the provision of improved tubular furniture construction in which the cost of fabrication may be of a reasonably low order, directly comparable with existing prior art constructions, thereby permitting consequent wide sale, distribution and use.

These objects, as well as other incidental ends and advantages, will more fully appear in the progress of the following disclosure, and be pointed out in the appended claims.

In the drawing, to which reference will be made in the specification, similar reference characters have been employed to designated corresponding parts throughout the several views.

FIG. 1 is an exploded view in perspective showing an embodiment of the invention.

FIG. 2 is a vertical sectional view as seen from the plane 2—2 in FIG. 1.

FIG. 3 is a vertical sectional view as seen from the plane 3—3 in FIG. 1.

FIG. 4 is a view in perspective showing an alternate form of the embodiment.

FIG. 5 is a top plan view of the structure illustrated in FIG. 4.

FIG. 6 is a top plan view of a second alternate form of construction.

In accordance with the invention, the construction, generally indicated by reference character 10, comprises broadly: a plurality of outer tubular elements 11, a plurality of interconnecting elements 12, each having anywhere from two to six inner tubular elements 13 extending therefrom.

The outer tubular elements 11 may be formed by extrusion, or as stamped parts, from synthetic resinous materials or metal, respectively, and may be of any desired length. Each element includes first, second, third and fourth walls, and is bounded by an inner surface 19 and an outer surface 20, parallel edges 21 and continuous end edges 22 bordering a rectangular opening 23.

The interconnecting elements 12 may be formed as injection moldings from either plastic or metallic materials, each including a base member 24 from which the inner tubular elements 13 project. Each tubular element includes first and second inner side walls 25 and 26 in mutual parallel relation, and an interconnecting side wall 27. Each of the walls 25–26 is bounded by an outer surface 28, an inner surface 29 and first and second longitudinal edges 30 and 31, respectively, as well as inner and outer end edges 32 and 33, respectively.

The interconnecting side wall 27 extends continuously between the inner surfaces 29 of the first and second side walls 25–26, and is bounded by four side edges 37, inner and outer end edges 38 and 39, respectively. Slots 40, the principal axis of which is transverse with respect to the principal axis of the respective inner tubular element extend through the plane of the wall 27, the dimensions of which are best appreciated from a consideration of FIG. 2.

As best seen in FIG. 3, the wall 27 is spaced from the longitudinal edges 30 of the walls 25 and 26, to define a recess 42 which accommodates a resilient locking tab 43 at each of the slots 40. This tab is most suitably formed as a metallic stamping, and includes a first longitudinal member 44, an offset member 45 and a second offset member 46, the free end 47 of which is provided with a plurality of sharpened points or barbs 48. During assembly, in which the outer tubular elements 11 are slid onto the inner tubular elements 13, the engaged inner surface of the elements 11 will slide over the points 48 without difficulty. Any movement tending to disconnect the outer tubular element from its respective inner tubular element will cause the points 48 to dig into the inner surface of the outer tubular element and resist such motion. When the construction is assembled, the first longitudinal member 44 will lie parallel to a surface of the wall 27, thus placing a resilient torque on the second longitudinal member 46 to urge it to the angular disposition shown in FIG. 3 for this purpose.

Referring again to FIG. 1, where desired, the outer tubular elements 11 may be provided with a longitudinal flange 50 which is offset with respect to the principal axis of the element, and extends laterally thereto. This permits the element to support a shelf edge or table top which rests thereupon. By offsetting the flange, shelves or table tops (not shown) of varying thicknesses may be accommodated.

Referring to the variation shown in FIG. 4, parts corresponding to those of the principal form have been designated by similar reference characters with the additional prefix "1." This variation provides additional slots 40 and additional corresponding resilient locking tabs 43, and is particularly suited for use with outer tubular members of relatively soft materials, where additional purchase is required.

The variation shown in FIG. 6 differs from that shown in FIGS. 4 and 5 in the placing of the inner tubular elements 13 at other than a right angle, as for example approximately 87°. Upon assembly, additional stress is introduced into the engaged outer tubular elements in a direction transverse to the principal axis thereof, this tending to rigidify the structure, and incidentally permitting greater variance in commercial tolerance with respect to the comparative sizes of the cross section of the opening 23 and the corresponding cross section of the inner tubular element. Normally, only one such device, as shown in FIG. 6, need be used in connection with each assembled rectangular configuration of elements 11 and 12.

I wish it to be understood that I do not consider the invention limited to the precise details of structure shown and set forth in this specification, for obvious modifications will occur to those skilled in the art to which the invention pertains.

I claim:

1. A tubular furniture construction including a plurality of elongated outer tubular members of generally rectangular cross-section, and defining a rectangular opening at at least one end thereof, a plurality of interconnecting elements each having a plurality of elongated engaging means projectable into said rectangular openings to retain said outer tubular members in assembled condition, said interconnecting means each including a pair of parallel walls having dimensions corresponding to those of said rectangular openings to allow frictional engagement therewith, and a third wall disposed at right angles with respect to said pair of walls, and disposed therebetween; said elongated engaging means being mutually disposed at other than a right angle, whereby when a plurality of said interconnecting means are interconnected to said outer tubular members to form a loop, said interconnecting means may exert a stress upon said outer tubular members perpendicular to the principal axis thereof tending to increase the frictional forces holding said loop together.

2. Structure in accordance with claim 1 in which said last mentioned angle is less than a right angle.

3. A tubular furniture construction including a plurality of elongated outer tubular members of generally rectangular cross section, and defining a rectangular opening at at least one end thereof, a plurality of interconnecting elements each having a plurality of elongated engaging means projectable into said rectangular openings to retain said outer tubular members in assembled condition, said interconnecting means each including a pair of parallel walls having dimensions corresponding to those of said rectangular openings to allow frictional engagement therewith, and a third wall disposed a right angles with respect to said pair of walls, and disposed therebetween to define a flat interstice therewith; and a resilient locking tab mounted on said last mentioned third wall, the operative part of which is positioned within said interstice, said tab having barbed points adapted to slide over an inner surface of said outer tubular members during the engagement thereof with said interconnecting means, and to cut into said surface to resist disengagement thereof; said resilient tab including an elongated portion, said third wall having an opening therein, said elongated portion extending through said opening to position said tab for limited pivotal movement relative to said third wall.

4. Structure in accordance with claim 3, in which at least one of said interconnecting elements includes engaging means which are disposed at other than a mutual right angle with respect to other engaging means disposed in a common plane to thereby exert stress upon engaged outer tubular members in a direction perpendicular to the principal axes thereof to compensate for enlarged tolerances.

* * * * *